W. H. Gwynne.
Making Water Gas.
No. 1,505. Patented Jun. 30, 1863.
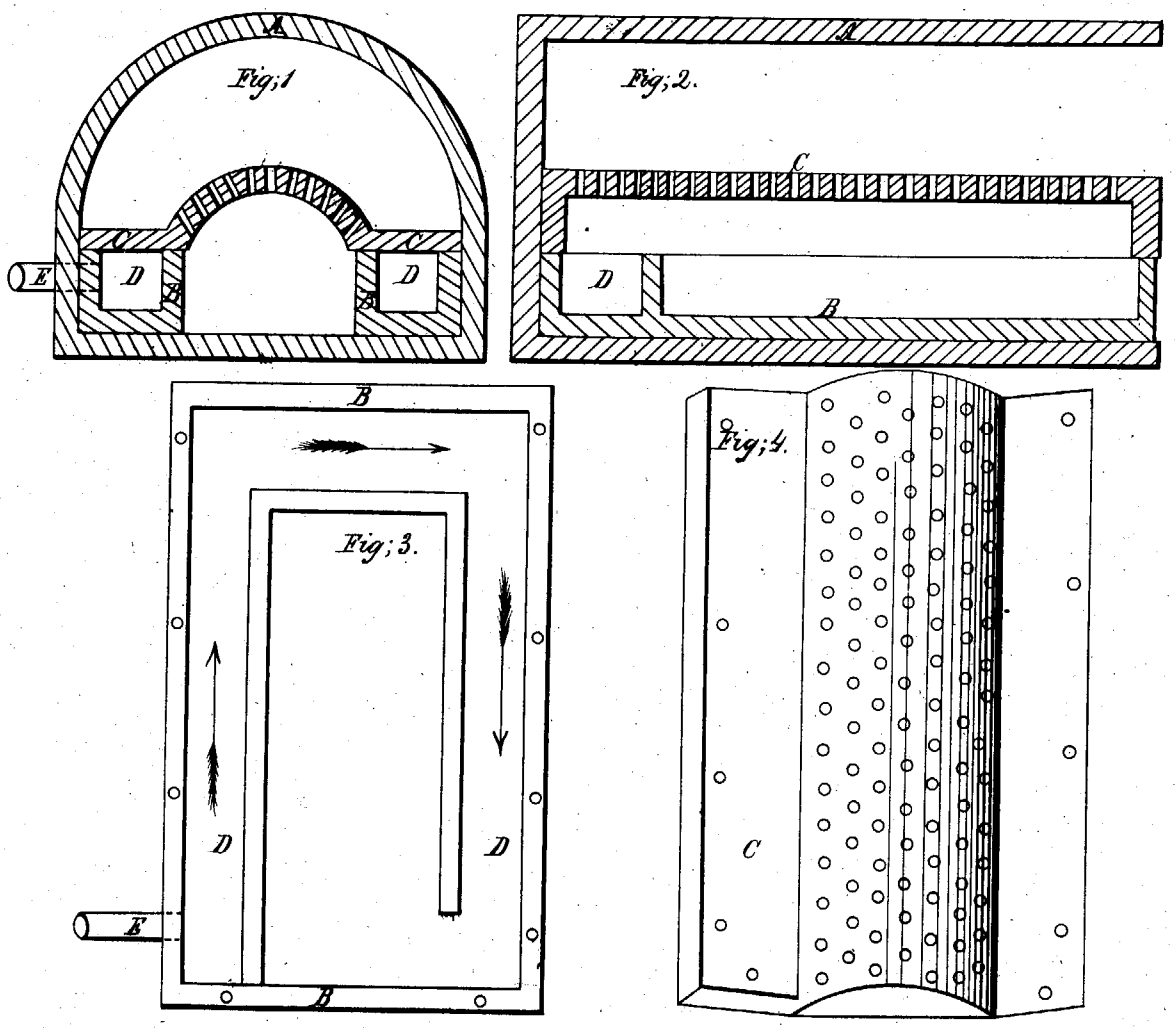
Witness.
Charles S. Brown Jr.
Inventor.
W. H. Gwynne

UNITED STATES PATENT OFFICE.

W. H. GWYNNE, OF WHITE PLAINS, NEW YORK.

IMPROVEMENT IN THE PROCESS OF MAKING WATER-GAS.

Specification forming part of Letters Patent No. 34,632, dated March 11, 1862; Reissue No. 1,505, dated June 30, 1863.

DIVISION B.

*To all whom it may concern:*

Be it known that I, W. H. GWYNE of White Plains, county of Westchester, State of New York, (formerly of Brooklyn, in said State,) have invented new and useful Improvements in the Process of Making Water-Gas; and I do hereby declare that the following is a full and correct description thereof, reference being had to the annexed drawings, making a part of this specification, in which—

Figure 1 is a transverse section of a retort with my apparatus placed therein. Fig. 2 is a longitudinal section of the same. Fig. 3 shows the lower part of my apparatus, with its interior circulating-passage and connecting-pipe. Fig. 4 shows the cover of the same, with its curved top and perforations.

In the operation or making water-gas it has heretofore been the practice to produce hydrogen and the other gases resulting from the decomposition of water by bringing the vapor of water in contact with incandescent charcoal, or coke, or other decomposing material, placed in a suitable retort, from which the said gases are conducted by means of a suitable pipe to a gas-retort, where they meet the hydrocarbon vapors and gases eliminated from the coal or other suitable gas-yielding substances.

It has been the practice to introduce the steam or vapor of water by means of a pipe into some part of the hydrogen-retort, into which it issues from the open end of the pipe in volume according to the diameter of the pipe and the pressure of the steam, filling the retort, or tending to do so, thereby causing a diminution of temperature, making it difficult, if not impossible, to keep up the temperature of the retort necessary for the constant production of the hydrogen, which is of great importance in the successful manufacture of water-gas in order to keep pace with the constant production of the hydrocarbon vapors and gases in the carbonizing and mixing retort.

My said invention consists in an improvement in said process, whereby I obtain a more uniform mixture of gases eliminated from coal and water, or their equivalent, in separate retorts, by supplying the hydrocarbon gas-retort with gases that are eliminated from the vapor of water in a separate retort in a manner that insures as far as possible to such operation a constant and uniform supply of such gases—viz., by passing the steam, previously superheated to about the temperature of the incandescent decomposing material, in a finely-divided state through the mass of said decomposing material in the decomposing-retort, and conducting the gases thus formed to the hydrocarbon or mixing retort.

In carrying out my invention I use the apparatus figured in the drawings, which consists in a steam chamber or conductor placed inside the retort, and connected from the outside of the retort by a suitable pipe leading from the steam-boiler, said chamber being so placed in said retort as to be subject to the action of the fuel applied for heating said retort, and perforated in parts coming in contact with the incandescent charcoal or coke or other decomposing material with small holes, so that the vapor of water being admitted into the said chamber, it is heated in said chamber to about the temperature of the incandescent material placed over and upon and partially around said chamber, immediately before it is through in contact therewith, by passing brought the small holes or perforations in said chamber. These holes I prefer to have made about one-eighth of an inch in diameter, but the oxidation of the metal soon causes them to contract to about one-sixteenth of an inch in diameter. The effect of this mode of bringing the steam at high temperature in a finely-divided state in direct contact with a large surface of incandescent decomposing material is to insure an immediate and perfect decomposition of the steam without diminishing the temperature, thus securing a constant production of the desired gases. I call this chamber a "distributing" box or chamber, because it is the medium of distributing the superheated steam among the incandescent decomposing material in finely-divided state.

In the drawings, letter B represents the distributer, provided with a circulating-passage, D, (shown in Figs. 1, 2, and 3,) also with the pipe E, connecting with the steam-boiler or a water-siphon, so that when steam or water is let into the pipe E it enters the passage D, and travels entirely around the box B before passing through the perforated cover C into the retort A, thereby becoming highly heated before entering the hot charcoal or coke with which the retort A is filled. In this form of my apparatus it will be seen that water may be admitted, care being taken to regulate the quantity so as to produce the requisite amount of steam without cooling the retort by an excess of steam of low temperature, which would be the case were an excess of water to be admitted.

In operating my apparatus I place the charcoal or coke or iron chips or other suitable material for decomposing water within the retort over and upon and around the distributing-chamber, and apply heat to the retort in the usual manner, and when the retort is heated to a bright-red heat the steam or water may be allowed to enter through the pipe E, and, passing through the circulating space D, it enters the retort through the holes in the cover of the distributor C among the incandescent material contained therein, and is rapidly transformed into permanent gas.

I have described the form of distributor I consider best adapted for use; but it is evident that other forms of apparatus may be used which will embody the same mode of operation and perform the functions of the distributor—as, for instance, a conducting-pipe of zigzag or other suitable form laid flat upon the bottom of the retort and perforated upon its upper surfaces and closed at the end.

I claim as my invention and improvement—

In a process of manufacture of hydrocarbon illuminating-gas, commonly called "water gas," the within-described mode of obtaining a more uniform mixture of gases eliminated from coal and water, or their equivalents, in separate retorts, by supplying the hydrocarbon-gas retort with gases eliminated from vapor of water in a separate retort by passing steam superheated to about the temperature of the incandescent decomposing material in a finely-divided state through the mass of said decomposing material, substantially as and for the purposes set forth.

W. H. GWYNNE.

Witnesses:
CHARLES D. BROWN, Jr.,
C. ELTON BUCK.